United States Patent
Hochgraef et al.

(10) Patent No.: US 6,809,913 B2
(45) Date of Patent: Oct. 26, 2004

(54) LOW-VOLTAGE CIRCUIT BREAKER COMPRISING A DATA MEMORY

(75) Inventors: Holger Hochgraef, Ganzer/Wusterhausen (DE); Michael Jankowiak, Berlin (DE); Jeffery C. Mizener, Sidney, OH (US); Aron-Ernst Musiol, Berlin (DE); Andreas Pancke, Berlin (DE); Hans Rehaag, Zepernick (DE); Manfred Schiller, Berlin (DE); Gerhard Tietz, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/257,451

(22) PCT Filed: Apr. 9, 2001

(86) PCT No.: PCT/DE01/01489

§ 371 (c)(1),
(2), (4) Date: Apr. 4, 2003

(87) PCT Pub. No.: WO01/78099

PCT Pub. Date: Oct. 18, 2001

(65) Prior Publication Data

US 2003/0156373 A1 Aug. 21, 2003

(30) Foreign Application Priority Data

Apr. 12, 2000 (DE) .......................................... 100 19 092

(51) Int. Cl.[7] .............................................. H02H 3/00
(52) U.S. Cl. ...................... 361/93.3; 439/620; 439/946
(58) Field of Search .............................. 361/93.2, 93.3, 361/93.6, 115; 439/620, 946; 340/531, 638, 3.1, 3.3, 3.31, 3.32

(56) References Cited

U.S. PATENT DOCUMENTS

| | | | | |
|---|---|---|---|---|
| 4,649,455 A | * | 3/1987 | Scott | 361/93.3 |
| 4,661,879 A | * | 4/1987 | Sato et al. | 361/58 |
| 4,695,961 A | * | 9/1987 | Arinobu | 702/62 |
| 5,331,500 A | | 7/1994 | Corcoles et al. | 361/93 |
| 5,539,605 A | * | 7/1996 | Pollman et al. | 361/92 |
| 5,604,437 A | * | 2/1997 | Moncorge et al. | 324/424 |
| 5,835,325 A | * | 11/1998 | Tripodi et al. | 361/94 |
| 6,018,447 A | * | 1/2000 | Hannah et al. | 361/42 |
| 6,034,859 A | * | 3/2000 | Baumgartl | 361/93.6 |
| 6,140,928 A | * | 10/2000 | Shibuya et al. | 340/636.13 |
| 6,400,547 B1 | * | 6/2002 | Pohl | 361/115 |
| 6,559,648 B2 | * | 5/2003 | Baumgaertl et al. | 324/424 |
| 6,639,775 B1 | * | 10/2003 | Musiol et al. | 361/93.3 |

FOREIGN PATENT DOCUMENTS

| | | | | |
|---|---|---|---|---|
| EP | 0 493 272 B1 | | 12/1991 | H01H/71/74 |
| WO | WO 97/08725 | | 3/1997 | H01H/71/12 |
| WO | WO 00/19474 | | 4/2000 | H01H/71/12 |

* cited by examiner

Primary Examiner—Ronald Leja
(74) Attorney, Agent, or Firm—Harness, Dickey & Pierce, P.L.C.

(57) ABSTRACT

Data memories are used to represent the characteristic values of the properties of the circuit-breaker and the associated current transformer. A cable harness uses a writeable electronic memory module which is inserted into one of the interconnecting cables between the current transformer(s) and the overcurrent trip as the data memory.

21 Claims, 2 Drawing Sheets

LOW-VOLTAGE CIRCUIT BREAKER COMPRISING A DATA MEMORY

This application is the national phase under 35 U.S.C. § 371 of PCT International Application No. PCT/DE01/01489 which has an International filing date of Apr. 9, 2001, which designated the United States of America and which claims priority on German Patent Application number DE 100 19 092.8 filed Apr. 12, 2000, the entire contents of which are hereby incorporated herein by reference.

FIELD OF THE INVENTION

The invention generally relates to a low-voltage circuit breaker having a data memory. Preferably, the data memory is for passing characteristic values of the circuit breaker and/or of the associated current transformer to an electronic overcurrent release. Additionally, it preferably includes at least one connection line between the current transformer or transformers and the overcurrent release.

BACKGROUND OF THE INVENTION

Circuit breakers are known which have a data memory which stores unchangeable characteristic values for the circuit breaker such as the type and rating current as well as characteristic values for the connected current transformer. When a release is replaced, data from the data memory is read to the release which has been inserted, and which then need not be reconfigured.

EP-B 0 493 272 discloses a circuit breaker which has an adapter board which is permanently connected to it and to which the release is connected. The adapter board includes a device for mapping the type and/or rating of the circuit breaker, as well as an output plug connector, which is connected to the release.

WO 97/08 725 discloses a further circuit breaker, whose data memory is mounted detachably on one side of the housing. This means that the data memory is also always included in the testing of the overcurrent release. If only the overcurrent release is intended to be replaced, then the data memory is disconnected from the overcurrent release and is attached to the new release, so that the characteristic values of the circuit breaker are transferred. However, during the process, there is a risk of the data memory being mislaid or confused in the course of the replacement of the release. Furthermore, the arrangement is susceptible to defects, due to the large number of plug connections in it.

In order to minimize the plug connections, it has also already been proposed for the data memory to be arranged as component of a two-part plug connection on the connection line between the current transformer and the overcurrent release, whose second component belongs to the overcurrent release. However, accommodation of the data memory in a plug part requires a specially designed component, which must be fitted with resistors individually for each switch type. The number of parameters which can be stored is, furthermore, small in this case.

SUMMARY OF THE INVENTION

An embodiment of the invention is based on the object of specifying a low-voltage circuit breaker in which the data memory operates in an improved manner, and whose construction is simple.

According to this, an electronic memory module which can be written to can be used as the data memory, and can be inserted into one of the connection lines between the current transformer or transformers and the overcurrent release.

An EEPROM, by way of example, can be used as the memory module. In order to avoid injected interference, the memory module should expediently be arranged toward the release-side end of the connection line. The memory module can include its own housing, through which the connection line runs.

On the one hand, the solution has the advantage that a sufficiently large number of parameters can be stored. The coding can be carried out in the course of testing the switch. On the other hand, normal standard plugs can be used for the plug connector. Overall, the connection line from the current transformer or the current transformers becomes a standard component in the switch manufacturing process in which the parameters of the associated switch are stored in the course of switch testing.

BRIEF DESCRIPTION OF THE DRAWINGS

The invention will be explained in more detail in the following text with reference to an exemplary embodiment. In the associated drawings.

DETAILED DESCRIPTION OF THE PREFERRED EMBODIMENTS

Figure 1:
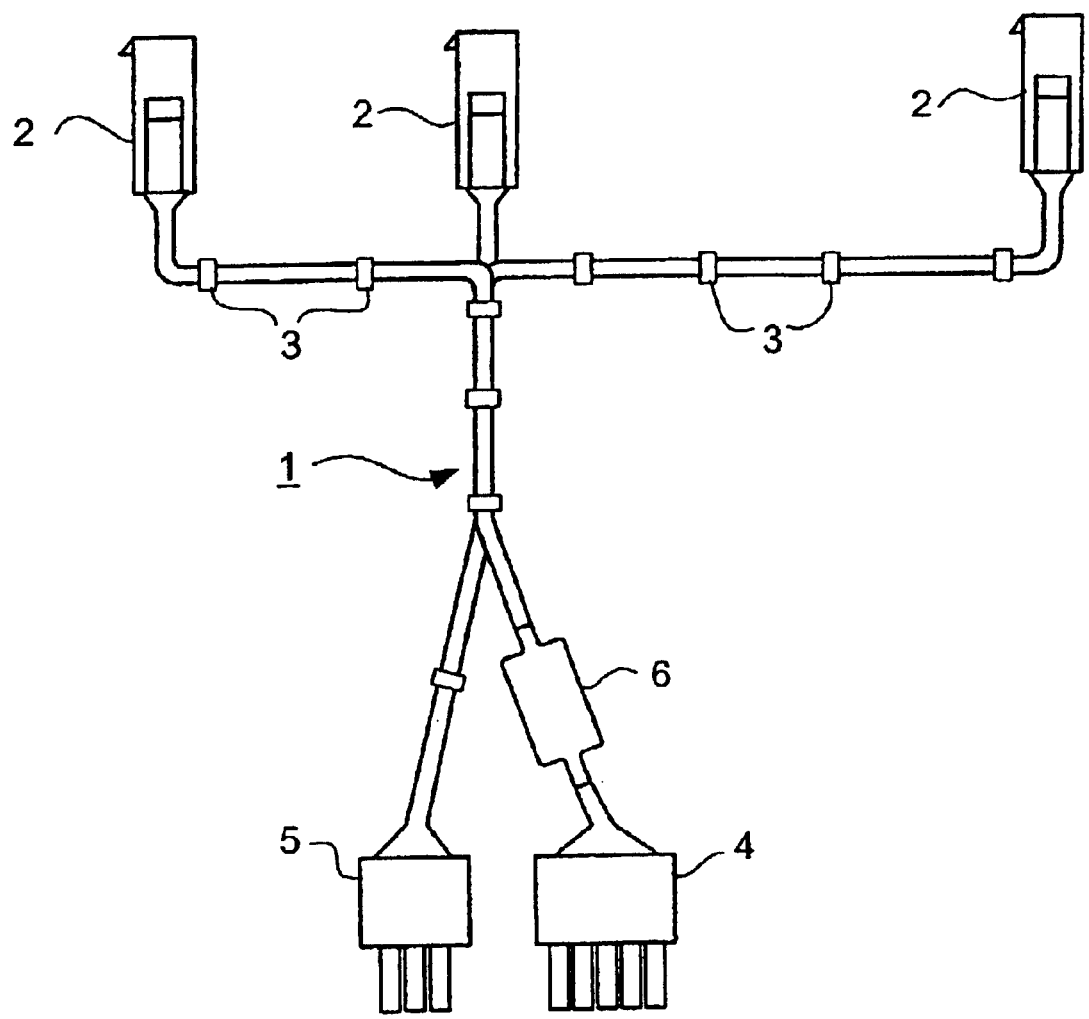
FIG. 1 shows a cable harness for connecting the current transformer of a circuit breaker to the overcurrent release.
Figure 3:
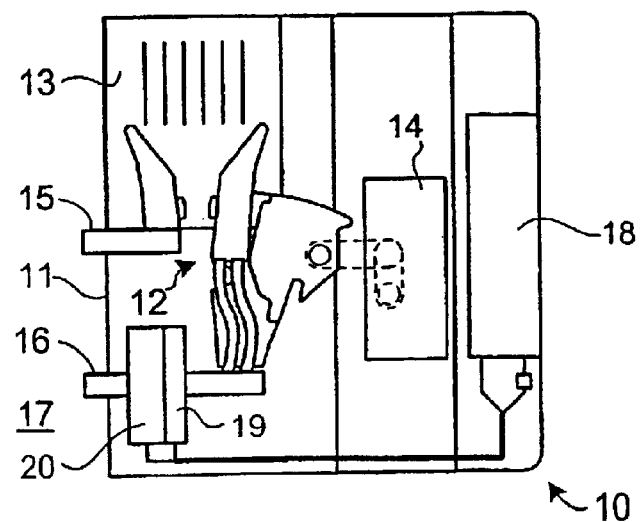
FIG. 3 shows a schematic illustration of a low-voltage circuit breaker with a cable harness as shown in FIGS. 1 and 2.

FIG. 1 shows a cable harness for the connection of an overcurrent release 18 (FIG. 3) to converter sets 17 (FIG. 3). Each converter set 17 in this case includes, in a known manner, a current transformer 19 and a power transformer 20. Three plugs 2 firstly create the connection for three such transformer sets 17 which supply the measurement current of each pole or of each switching contact system 12 of the three-pole circuit breaker 10 (FIG. 3) for its overcurrent release 18, and on the other hand provide auxiliary power for the operation of the overcurrent release 18. The individual lines are connected by cable ties 3 to form the cable harness 1. The other of the two ends of the cable harness 1 are fitted with plug connectors 4 and 5 for connection to the overcurrent release 18, on the one hand for the measurement current and on the other hand for the power supply.

A housing 6 is inserted in the measurement line run, in which housing 6 an EEPROM 7 is accommodated as a data memory for the characteristic values of the circuit breaker 10 and/or of the current transformers 19, or of the overall transformer set 17.

Figure 2:
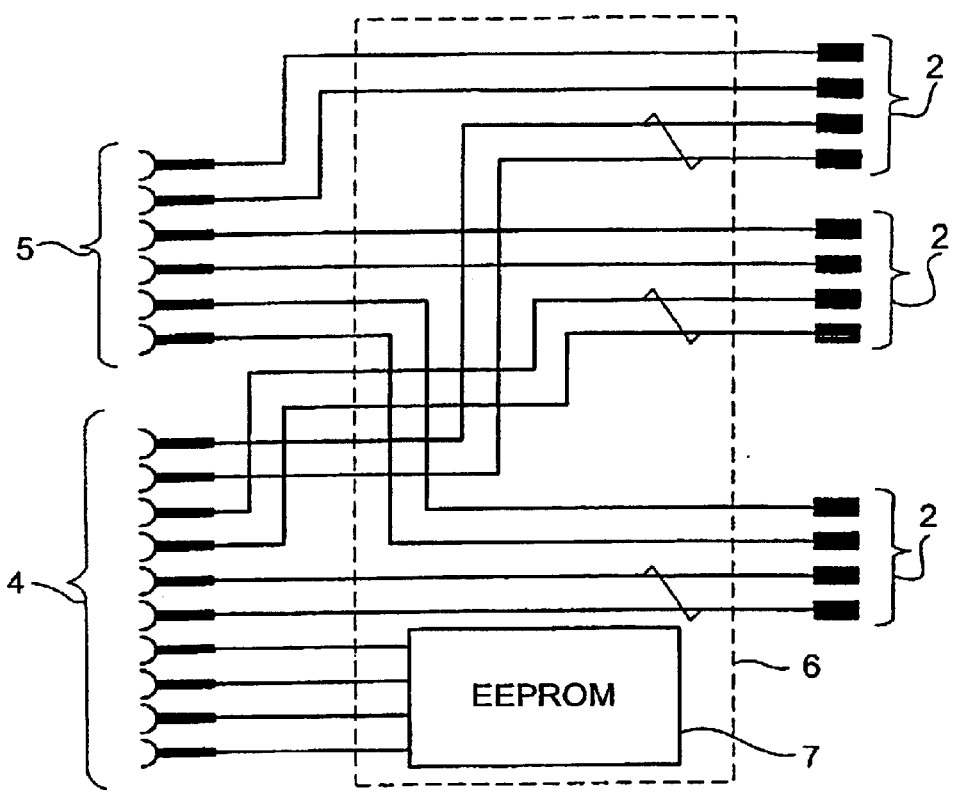
FIG. 2 shows the associated circuit of the cable harness.

FIG. 2 shows the line run within the cable harness 1 and the housing 6. Two lines for one phase are respectively used as the forward line and return line for the supply current, and two twisted lines are in each case used as the forward line and return line for the measurement current. The twisting is identified by a zigzag line in FIG. 2. The lines pass through the housing 6 in which the EEPROM 7 is located. In the present case, this is a four-wire element; however, two-wire elements in the form of button cells are also available as EEPROM's, and these would allow the plug contact points to be further miniaturized.

FIG. 3 illustrates the use of the described cable harness 1 for a low-voltage circuit breaker 10. The circuit breaker 10 has, in a known manner, a housing 11 in which a switching contact system 12 with an associated quenching chamber 13 and a drive apparatus 14 for joint operation of all the switching contact systems 12 which are present are accommodated, for each pole. Each switching contact system 12 has an upper connecting rail 15 and a lower connecting rail 16, in order to connect the circuit breaker 10 to a circuit. Each lower connecting rail 16 has an associated transformer set 17, which detects the current flowing via the associated switching contact system 12 and provides auxiliary power for the operation of an electronic overcurrent release 18. As already mentioned, each transformer set 17 for this purpose has a current transformer 19 and a power transformer 20.

The connection rails 15 and 16 as well as the transformer sets 17 are located on the rear face of the housing 11, while the electronic overcurrent release 18 is arranged on the opposite front face of the housing 11. In order to connect the transformer sets 17 to the overcurrent release 18, the cable harness 1 is made in some suitable manner in the lower region of the housing 11. As can be seen, the housing 6 for the memory module is located close to the overcurrent release 18.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A low-voltage circuit breaker, comprising:
   a data memory for passing characteristic values of at least one of the circuit breaker and at least one associated current transformer, to an electronic overcurrent release; and
   at least one connection line, between at least one current transformer and the overcurrent release, wherein the data memory is an electronic memory module, adapted to be written to, and is inserted into one of the connection lines between at least one current transformer and the overcurrent release.

2. The low-voltage circuit breaker as claimed in claim 1, wherein the memory module is an EEPROM.

3. The low-voltage circuit breaker as claimed in claim 1, wherein the memory module is inserted at a release-side end of the connection line.

4. The low-voltage circuit breaker as claimed in claim 1, wherein the memory module is accommodated in a housing.

5. The low-voltage circuit breaker as claimed in claim 1, wherein the memory module is a four-wire element.

6. The low-voltage circuit breaker as claimed in claim 2, wherein the memory module is a two-wire element.

7. The low-voltage circuit breaker as claimed in claim 2, wherein the memory module is accommodated in a housing.

8. The low-voltage circuit breaker as claimed in claim 2, wherein the memory module is a four-wire element.

9. The low-voltage circuit breaker as claimed in claim 3, wherein the memory module is a two-wire element.

10. The low-voltage circuit breaker as claimed in claim 3, wherein the memory module is accommodated in a housing.

11. The low-voltage circuit breaker as claimed in claim 3, wherein the memory module is a four-wire element.

12. The low-voltage circuit breaker as claimed in claim 4, wherein the memory module is a two-wire element.

13. The low-voltage circuit breaker as claimed in claim 4, wherein the memory module is a four-wire element.

14. A cable harness for a low-voltage circuit breaker, comprising:
    a data memory, adapted to store characteristic values of at least one of the circuit breaker and an associated current transformer; and
    at least one connection line between at least one current transformer and an overcurrent release, wherein the data memory is a writable electronic memory module, inserted into at least one connection line between at least one current transformer and the overcurrent release.

15. The cable harness as claimed in claim 14, wherein the memory module is an EEPROM.

16. The cable harness as claimed in claim 14, wherein the memory module is inserted at a release-side end of the connection line.

17. The cable harness as claimed in claim 14, wherein the memory module is accommodated in a housing.

18. The cable harness as claimed in claim 14, wherein the memory module is a four-wire element.

19. The cable harness as claimed in claim 14, wherein the memory module is a two-wire element.

20. The low-voltage circuit breaker of claim 4, wherein the at least one connection line runs through the housing.

21. The cable harness of claim 17, wherein the at least one connection line runs through the housing.

* * * * *